US012757828B2

(12) United States Patent
O'Connor et al.

(10) Patent No.: US 12,757,828 B2
(45) Date of Patent: Oct. 13, 2026

(54) AUTOMATIC AUGER ENGAGEMENT FOR UNLOADING OPERATION

(71) Applicant: Deere & Company, Moline, IL (US)

(72) Inventors: Kellen E. O'Connor, Clive, IA (US); Sara C. O'Connor, Clive, IA (US); Jeremy J. Faust, Grimes, IA (US); Ryan R. White, Polk City, IA (US)

(73) Assignee: Deere & Company, Moline, IL (US)

(*) Notice: Subject to any disclaimer, the term of this patent is extended or adjusted under 35 U.S.C. 154(b) by 329 days.

(21) Appl. No.: 18/438,093

(22) Filed: Feb. 9, 2024

(65) Prior Publication Data

US 2025/0008872 A1 Jan. 9, 2025

Related U.S. Application Data

(60) Provisional application No. 63/512,368, filed on Jul. 7, 2023.

(51) Int. Cl.

| | |
|---|---|
| ***A01D 41/127*** | (2006.01) |
| ***A01D 41/12*** | (2006.01) |
| ***A01D 43/08*** | (2006.01) |
| ***A01D 90/10*** | (2006.01) |

(52) U.S. Cl.

CPC ..... *A01D 41/1275* (2013.01); *A01D 41/1217* (2013.01); *A01D 90/10* (2013.01); *A01D 43/087* (2013.01); *Y10S 56/15* (2013.01)

(58) Field of Classification Search

CPC .... A01D 41/1217; A01D 41/127–1273; A01D 41/1275; A01D 90/10; A01D 90/105; A01D 43/073; A01D 43/087; Y10S 56/15

See application file for complete search history.

(56) References Cited

U.S. PATENT DOCUMENTS

| | | | |
|---|---|---|---|
| 8,032,255 | B2 | 10/2011 | Phelan et al. |
| 8,060,283 | B2 | 11/2011 | Mott et al. |
| 8,126,620 | B2 | 2/2012 | Ringwald et al. |
| 8,380,401 | B2 | 2/2013 | Pighi et al. |
| 8,626,406 | B2 | 1/2014 | Schleicher et al. |
| 8,662,972 | B2 | 3/2014 | Behnke et al. |
| 8,868,304 | B2 | 10/2014 | Bonefas |

(Continued)

FOREIGN PATENT DOCUMENTS

| | | |
|---|---|---|
| CA | 2791436 A1 | 4/2014 |
| CN | 108550141 A | 9/2018 |

(Continued)

OTHER PUBLICATIONS

U.S. Appl. No. 18/352,576 Application and Drawings filed Jul. 14, 2023, 39 pages.

(Continued)

*Primary Examiner* — Spencer D Patton

(74) *Attorney, Agent, or Firm* — Christopher J. Volkmann; KELLY, HOLT & CHRISTENSON PLLC

(57) ABSTRACT

On a harvester, unload conditions are detected to determine whether an unloading operation should be commenced. If so, once a receiving vehicle is in a target position relative to a spout, an unloading auger is automatically engaged to unload harvested material from a clean grain tank, through the spout, into the receiving vehicle. When stop criteria are detected, then the unloading auger is automatically disengaged.

18 Claims, 9 Drawing Sheets

(56) References Cited

U.S. PATENT DOCUMENTS

| | | | | |
|---|---|---|---|---|
| 9,043,096 | B2 | 5/2015 | Zielke et al. | |
| 9,049,817 | B2 | 6/2015 | McCully et al. | |
| 9,119,342 | B2 | 9/2015 | Bonefas | |
| 9,169,032 | B2 | 10/2015 | Gengerke | |
| 9,185,845 | B2 | 11/2015 | Van Mill et al. | |
| 9,187,259 | B2 | 11/2015 | Van Mill et al. | |
| 9,272,853 | B2 | 3/2016 | Van Mill et al. | |
| 9,326,444 | B2 | 5/2016 | Bonefas | |
| 9,392,746 | B2 | 7/2016 | Darr et al. | |
| 9,457,971 | B2 | 10/2016 | Bonefas et al. | |
| 9,529,364 | B2 | 12/2016 | Foster et al. | |
| 9,545,048 | B2 | 1/2017 | Pickett et al. | |
| 9,596,805 | B2 | 3/2017 | Van Mill et al. | |
| 9,596,809 | B2 | 3/2017 | Van Mill et al. | |
| 9,615,509 | B2 | 4/2017 | Flickinger et al. | |
| 9,642,305 | B2 | 5/2017 | Nykamp et al. | |
| 9,763,389 | B2 | 9/2017 | Bump et al. | |
| 9,820,436 | B2 | 11/2017 | Inoue et al. | |
| 9,861,040 | B2 | 1/2018 | Bonefas | |
| 9,873,570 | B2 | 1/2018 | Van Mill et al. | |
| 9,992,931 | B2 | 6/2018 | Bonefas et al. | |
| 10,019,790 | B2 | 7/2018 | Bonefas et al. | |
| 10,028,434 | B2 | 7/2018 | Van Mill et al. | |
| 10,028,441 | B2 | 7/2018 | Van Mill et al. | |
| 10,028,442 | B1 | 7/2018 | Crosby | |
| 10,106,333 | B2 | 10/2018 | Beaujot et al. | |
| 10,278,328 | B2 | 5/2019 | Thomson et al. | |
| 10,292,327 | B2 | 5/2019 | Ducroquet et al. | |
| 10,351,364 | B2 | 7/2019 | Green et al. | |
| 10,406,961 | B2 | 9/2019 | Grodecki et al. | |
| 10,760,946 | B2 | 9/2020 | Meier et al. | |
| 10,765,063 | B2 | 9/2020 | Van Mill et al. | |
| 10,807,812 | B2 | 10/2020 | Thomson et al. | |
| 11,008,177 | B2 | 5/2021 | Banthia et al. | |
| 11,390,263 | B2 | 7/2022 | O'Connor et al. | |
| 11,457,562 | B2 | 10/2022 | Van Mill et al. | |
| 11,825,765 | B2 | 11/2023 | Van Mill et al. | |
| 11,957,078 | B1 | 4/2024 | Herichkoff | |
| 2006/0046800 | A1 | 3/2006 | Kaltenheuser | |
| 2009/0321154 | A1 | 12/2009 | Johnson | |
| 2011/0066337 | A1 | 3/2011 | Kormann | |
| 2011/0220677 | A1 | 9/2011 | Bertolani | |
| 2012/0215394 | A1 | 8/2012 | Wang et al. | |
| 2013/0211658 | A1 | 8/2013 | Bonefas | |
| 2014/0224377 | A1 | 8/2014 | Bonefas | |
| 2014/0311113 | A1* | 10/2014 | Bonefas | A01D 34/008 56/10.2 R |
| 2015/0023775 | A1* | 1/2015 | Bonefas | A01D 43/087 414/813 |
| 2015/0149048 | A1 | 5/2015 | Menke et al. | |
| 2015/0264866 | A1* | 9/2015 | Foster | A01B 69/004 414/21 |
| 2017/0042088 | A1 | 2/2017 | Nykamp et al. | |
| 2017/0055446 | A1 | 3/2017 | Nykamp et al. | |
| 2018/0037424 | A1 | 2/2018 | Green et al. | |
| 2018/0042179 | A1 | 2/2018 | Bonefas | |
| 2019/0124848 | A1* | 5/2019 | Johnson | B60P 1/42 |
| 2019/0277687 | A1 | 9/2019 | Blank et al. | |
| 2020/0039306 | A1 | 2/2020 | Rogan | |
| 2020/0133262 | A1 | 4/2020 | Suleman et al. | |
| 2020/0149949 | A1 | 5/2020 | Meier et al. | |
| 2020/0238882 | A1 | 7/2020 | Grieshop et al. | |
| 2020/0319655 | A1 | 10/2020 | Desai et al. | |
| 2021/0195840 | A1 | 7/2021 | Puryk et al. | |
| 2021/0294337 | A1* | 9/2021 | Van Mill | G05D 1/0246 |
| 2021/0329840 | A1 | 10/2021 | Craig | |
| 2021/0337729 | A1 | 11/2021 | O'Connor et al. | |
| 2022/0015288 | A1 | 1/2022 | Christiansen et al. | |
| 2022/0015290 | A1 | 1/2022 | Yao et al. | |
| 2022/0019239 | A1 | 1/2022 | Christiansen et al. | |
| 2022/0071078 | A1 | 3/2022 | Boyer et al. | |
| 2022/0287239 | A1 | 9/2022 | Faust et al. | |
| 2022/0408641 | A1 | 12/2022 | Van Mill et al. | |
| 2022/0408645 | A1 | 12/2022 | O'Connor et al. | |
| 2022/0410704 | A1 | 12/2022 | O'Connor et al. | |
| 2023/0031013 | A1 | 2/2023 | Faust et al. | |
| 2023/0115778 | A1 | 4/2023 | Kahlig et al. | |
| 2024/0032474 | A1 | 2/2024 | Ritter et al. | |
| 2024/0103123 | A1 | 3/2024 | Meier et al. | |
| 2024/0123892 | A1 | 4/2024 | Graff et al. | |
| 2024/0130294 | A1 | 4/2024 | Currie et al. | |
| 2024/0147901 | A1 | 5/2024 | Debbaut et al. | |

FOREIGN PATENT DOCUMENTS

| | | | |
|---|---|---|---|
| DE | 102005025318 | A1 | 12/2006 |
| DE | 102009027245 | A1 | 12/2010 |
| DE | 102012211001 | A1 | 1/2014 |
| DE | 102015109799 | A1 | 12/2016 |
| DE | 102016214320 | A1 | 2/2017 |
| EP | 1219153 | A2 | 7/2002 |
| EP | 2044826 | A2 | 4/2009 |
| EP | 2245917 | A2 | 11/2010 |
| EP | 2995191 | A1 | 3/2016 |
| EP | 3316218 | A1 | 5/2018 |
| EP | 3473074 | A1 | 4/2019 |
| EP | 3815486 | A1 | 5/2021 |
| EP | 3949714 | A1 | 2/2022 |
| EP | 3955183 | A1 | 2/2022 |
| EP | 4056019 | A1 | 9/2022 |
| EP | 4062740 | A1 | 9/2022 |
| EP | 4070636 | A1 | 10/2022 |
| EP | 4101286 | A1 | 12/2022 |
| GB | 1104906 | A | 3/1968 |
| WO | 2018102524 | A1 | 6/2018 |
| WO | WO2022036114 | A1 | 2/2022 |
| WO | WO 2022061447 | A1 | 3/2022 |
| WO | 2023150219 | A1 | 8/2023 |

OTHER PUBLICATIONS

U.S. Appl. No. 18/447,718 Application and Drawings filed Aug. 10, 2023, 53 pages.

U.S. Appl. No. 18/358,401 Application and Drawings filed Jul. 25, 2023, 47 pages.

U.S. Appl. No. 18/471,701 Application and Drawings filed Sep. 21, 2023, 50 pages.

U.S. Appl. No. 63/381,178 Application and Drawings filed Oct. 27, 2022, 101 pages.

U.S. Appl. No. 63/381,187 Application and Drawings filed Oct. 27, 2022, 104 pages.

U.S. Appl. No. 63/512,368 Application and Drawings filed Jul. 7, 2023, 101 pages.

Tesla Motors Club Community Thread entitled "Lane change notification" 4 pages, originally posted Dec. 29, 2021 by user "Horvin". Retrieved from internet: <https://teslamotorsclub.com/tmc/threads/lane-change-notification.252072/>.

Autodesk, "Determine Volume of Solid", Oct. 16, 2019, 3 pages. <https://knowledge.autodesk.com/support/autocad/learn-explore/caas/sfdcarticles/sfdcarticles/Determine-volume-of-solid.html#:~:text=To%20determine%20the%20volume%20of%20a%20solid%20object%20%20use%20thePress%20ENTER>.

Stanley, Nick, Solidworks Calculating Volume of a Solid. GoEngineer. 6 pages. Feb. 3, 2022. Retrieved from the Internet: <https://www.goengineer.com/blog/solidworks-calculating-volume-of-a-solid>.

U.S. Appl. No. 18/465,580 Application and Drawings filed Sep. 12, 2023, 114 pages.

U.S. Appl. No. 18/334,886 Application and Drawings filed Jun. 14, 2023, 47 pages.

U.S. Appl. No. 18/334,863 Application and Drawings filed Jun. 14, 2023, 73 pages.

U.S. Appl. No. 18/334,869 Application and Drawings filed Jun. 14, 2023, 85 pages.

U.S. Appl. No. 18/334,861 Application and Drawings filed Jun. 14, 2023, 96 pages.

U.S. Appl. No. 18/334,874 Application and Drawings filed Jun. 14, 2023, 59 pages.

John Deere, Active Fill Control Retrieved from internet on Jun. 27, 2023, 2 pages. <https://www.deere.com/en/technology-products/precision-ag-technology/guidance/active-fill-control/>.

(56) References Cited

OTHER PUBLICATIONS

John Deere, Machine Sync Retrieved from internet: Jun. 27, 2023, 3 pages. <https://www.deere.com/en/technology-products/precision-ag-technology/guidance/machine-sync/>.

Huang, Xiaoshui & Mei, Guofeng & Zhang, Jian & Abbas, Rana. (2021). A comprehensive survey on point cloud registration, Mar. 5, 2021, 17 pages. Retrieved from internet: <https://www.researchgate.net/publication/349787695_A_comprehensive_survey_on_point_cloud_registration>.

Extended European Search Report and Written Opinion issued in European Patent Application No. 23203069.2, dated Mar. 18, 2024, in 07 pages.

Extended European Search Report and Written Opinion issued in European Patent Application No. 23202822.5, dated Mar. 19, 2024, in 07 pages.

Extended European Search Report and Written Opinion issued in European Patent Application No. 23203519.6, dated Mar. 14, 2024, in 05 pages.

Extended European Search Report and Written Opinion issued in European Patent Application No. 23203536.0, dated Mar. 14, 2024, in 06 pages.

Extended European Search Report and Written Opinion issued in European Patent Application No. 23203537.8, dated Mar. 14, 2024, in 05 pages.

Extended European Search Report and Written Opinion issued in European Patent Application No. 23202466.1, dated Mar. 26, 2024, in 07 pages.

Extended European Search Report and Written Opinion issued in European Patent Application No. 23202485.1, dated Mar. 26, 2024, in 07 pages.

Extended European Search Report and Written Opinion issued in European Patent Application No. 23202510.6, dated Apr. 4, 2024, in 08 pages.

Extended European Search Report and Written Opinion issued in European Patent Application No. 23202817.5, dated Apr. 23, 2024, in 08 pages.

Extended European Search Report for European Application No. 23203067.6, dated Mar. 26, 2024, 11 Pages.

Killbros: "1950 Dual-Auger Grain Cart," Killbros Farm Equipment, 2016, 8 Pages, Retrieved from URL: https://web.archive.org/web/20160203214035/https://www.killbrosequip.com/grain-carts/1950.

Search Report for German Application No. 102023132671.6, dated Jul. 4, 2024, 10 Pages.

Tumenjargal E., et al., "Development of ISO 11783 Compliant Agricultural Systems: Experience Report," Automotive Systems and Software Engineering, 2019, pp. 197-223.

Extended European Search Report and Written Opinion issued in European Patent Application No. 23203067.6 dated Aug. 6, 2024, in 11 pages.

Extended European Search Report and Written Opinion issued in European Patent Application No. 24180988.8 dated Nov. 19, 2024, in 08 pages.

* cited by examiner

AUTOMATIC AUGER ENGAGEMENT FOR UNLOADING OPERATION

CROSS-REFERENCE TO RELATED APPLICATION

The present application is based on and claims the benefit of U.S. provisional patent application Ser. No. 63/512,368, filed Jul. 7, 2023, the content of which is hereby incorporated by reference in its entirety.

FIELD OF THE DESCRIPTION

The present description relates to agricultural harvesters. More specifically, the present description relates to automatically engaging an unloading auger that unloads material from a harvester into a receiving vehicle.

BACKGROUND

There are many different types of agricultural equipment. Some such equipment includes agricultural harvesters, such as combine harvesters.

Combine harvesters engage crop in a field and process that crop to separate harvest material from residue. The harvest material is stored in the clean grain tank for later unloading.

In order to unload material from the clean grain tank into a receiving vehicle, an operator often controls an actuator on an unloading spout to move the unloading spout into a deployed position for unloading. Once in the deployed position, the operator actuates an unloading auger which transfers material from the clean grain tank, through the spout, and into the receiving vehicle. After the unloading operation is complete, the operator disengages the unloading auger and again actuates the actuator on the unloading spout in order to retract the unloading spout into a retracted position.

The discussion above is merely provided for general background information and is not intended to be used as an aid in determining the scope of the claimed subject matter.

SUMMARY

On a harvester, unload conditions are detected to determine whether an unloading operation should be commenced. If so, once a receiving vehicle is in a target position relative to a spout, an unloading auger is automatically engaged to unload harvested material from a clean grain tank, through the spout, into the receiving vehicle. When stop criteria are detected, then the unloading auger is automatically disengaged.

Example 1 is a computer implemented method, comprising:

automatically detecting an engagement criterion indicating that an unloading conveyor on a harvester is to be engaged; and automatically generating a conveyor start control signal to control the unloading conveyor to unload harvested material from the harvester through a spout based on detection of the engagement start criterion.

Example 2 is the computer implemented method of any or all previous examples and further comprising:

automatically detecting a disengagement criterion indicating that the unloading conveyor on the harvester is to be disengaged; and automatically generating a conveyor stop control signal to control the unloading conveyor to stop unloading harvested material from the harvester based on detection of the disengagement criterion.

Example 3 is the computer implemented method of any or all previous examples wherein automatically detecting an engagement criterion comprises:

detecting a position of an outlet end of the spout relative to a receiving vehicle;

determining whether the outlet end of the spout is in a target position relative to the receiving vehicle; and if so, generating an output indicating that the engagement criterion is detected.

Example 4 is the computer implemented method of any or all previous examples wherein automatically detecting a disengagement criterion comprises:

detecting a fill level in a clean grain tank of the harvester;

determining whether the fill level in the clean grain tank is at a predefined stop level; and if so, generating an output indicating that the disengagement criterion is detected.

Example 5 is the computer implemented method of any or all previous examples wherein automatically detecting a disengagement criterion comprises:

detecting a fill level in a receiving vehicle;

determining whether the fill level in the receiving vehicle is at a target level; and if so, generating an output indicating that the disengagement criterion is detected.

Example 6 is the computer implemented method of any or all previous examples wherein automatically detecting a disengagement criterion comprises:

detecting a material spill condition; and generating an output indicating that the disengagement criterion is detected.

Example 7 is the computer implemented method of any or all previous examples wherein automatically detecting a disengagement criterion comprises:

detecting an operator stop input; and generating an output indicating that the disengagement criterion is detected.

Example 8 is the computer implemented method of any or all previous examples and further comprising:

prior to automatically detecting the engagement criterion, automatically detecting whether an unload commencement criterion is present; and if so, automatically generating a spout swing control signal to control a spout swing actuator to move the spout from a retracted position to a deployed position.

Example 9 is the computer implemented method of any or all previous examples wherein automatically detecting whether an unload commencement criterion is present comprises:

automatically detecting a level of harvested material in a clean grain tank of the harvester;

determining whether the level of material in the clean grain tank meets a target level; and if so, determining that the unload commencement criterion is met.

Example 10 is the computer implemented method of any or all previous examples wherein automatically detecting whether an unload commencement criterion is present comprises:

automatically detecting a location of a receiving vehicle; and determining that the unload commencement criterion is met based on the location of the receiving vehicle.

Example 11 is the computer implemented method of any or all previous examples wherein automatically detecting whether an unload commencement criterion is present comprises:

automatically detecting whether a position of a receiving vehicle is within a desired proximity relative to a position of the harvester; and if so, automatically generating the spout swing control signal to control the spout swing actuator to move the spout from the retracted position to the deployed position.

Example 12 is the computer implemented method of any or all previous examples and further comprising:

prior to automatically generating the spout swing control signal, detecting whether an obstacle is present in a spout swing path through which the spout moves between the retracted position and the deployed position; and if not, generating an output indicating that the spout swing path is unobstructed.

Example 13 is the computer implemented method of any or all previous examples and further comprising:

automatically detecting whether a spout retraction criterion is present; and if so, automatically generating the spout swing control signal to move the spout from the deployed position to the retracted position.

Example 14 is an agricultural system, comprising:

at least one processor;

an engagement criterion detection system, implemented by the at least one processor, configured to automatically detect an engagement criterion indicating that an unloading conveyor on a harvester is to be engaged;

a disengagement criteria detection system, implemented by the at least one processor, configured to automatically detect a disengagement criterion indicating that the unloading conveyor on the harvester is to be disengaged; and an output generator, implemented by the at least one processor, configured to automatically generate a conveyor start control signal to control the unloading conveyor to unload harvested material from the harvester through a spout based on detection of the engagement criterion and to automatically generate a conveyor stop control signal to control the unloading conveyor to stop unloading harvested material from the harvester based on detection of the disengagement criterion.

Example 15 is the agricultural system of any or all previous examples and further comprising:

a spout swing actuator configured to move the spout from a retracted position to a deployed position;

an unload commencement criteria detection system configured to automatically detect whether an unload commencement criterion is present; and a spout deployment control system configured to automatically generate a spout control signal, based on detection of the unload commencement criterion, to control the spout swing actuator to move the spout from a retracted position to a deployed position.

Example 16 is the agricultural system of any or all previous examples and further comprising:

a spout swing path processing system configured to automatically detect, and generate a swing path signal indicative of, whether an obstacle is present in a spout swing path through which the spout moves between the retracted position and the deployed position, the spout deployment control system generating the spout control signal based on the swing path signal.

Example 17 is the agricultural system of any or all previous examples and further comprising:

a spout retraction control system configured to automatically detect whether a spout retraction criterion is present and to automatically generate the spout control signal to move the spout from the deployed position to the retracted position based on detection of the spout retraction criterion.

Example 18 is the agricultural system of any or all previous examples and further comprising:

at least one sensor configured to sense a variable indicative of the engagement criterion and generate a sensor signal having a first value indicative of the sensed variable, the engagement criterion detection system being configured to automatically detect the engagement criterion based on the first value, the at least one sensor being configured to sense a variable indicative of the disengagement criterion and generate a sensor signal having a second value indicative of the sensed variable, the disengagement criteria detection system being configured to automatically detect the disengagement criterion based on the second value.

Example 19 is an agricultural harvester, comprising:

a storage tank;

a harvesting system configured to engage crop and move the crop to the storage tank;

a spout;

a spout actuator mounted to the agricultural harvester and actuatable to move the spout between a retracted position and a deployed position;

an unload commencement criteria detection system configured to automatically detect whether an unload commencement criterion is present; and a spout deployment control system configured to automatically generate a spout control signal, based on detection of the unload commencement criterion, to control the spout actuator to move the spout from the retracted position to the deployed position.

Example 20 is the agricultural harvester of any or all previous examples and further comprising:

a spout swing path processing system configured to automatically detect, and generate a swing path signal indicative of, whether an obstacle is present in a spout swing path through which the spout moves between the retracted position and the deployed position, the spout deployment control system generating the spout control signal based on the swing path signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
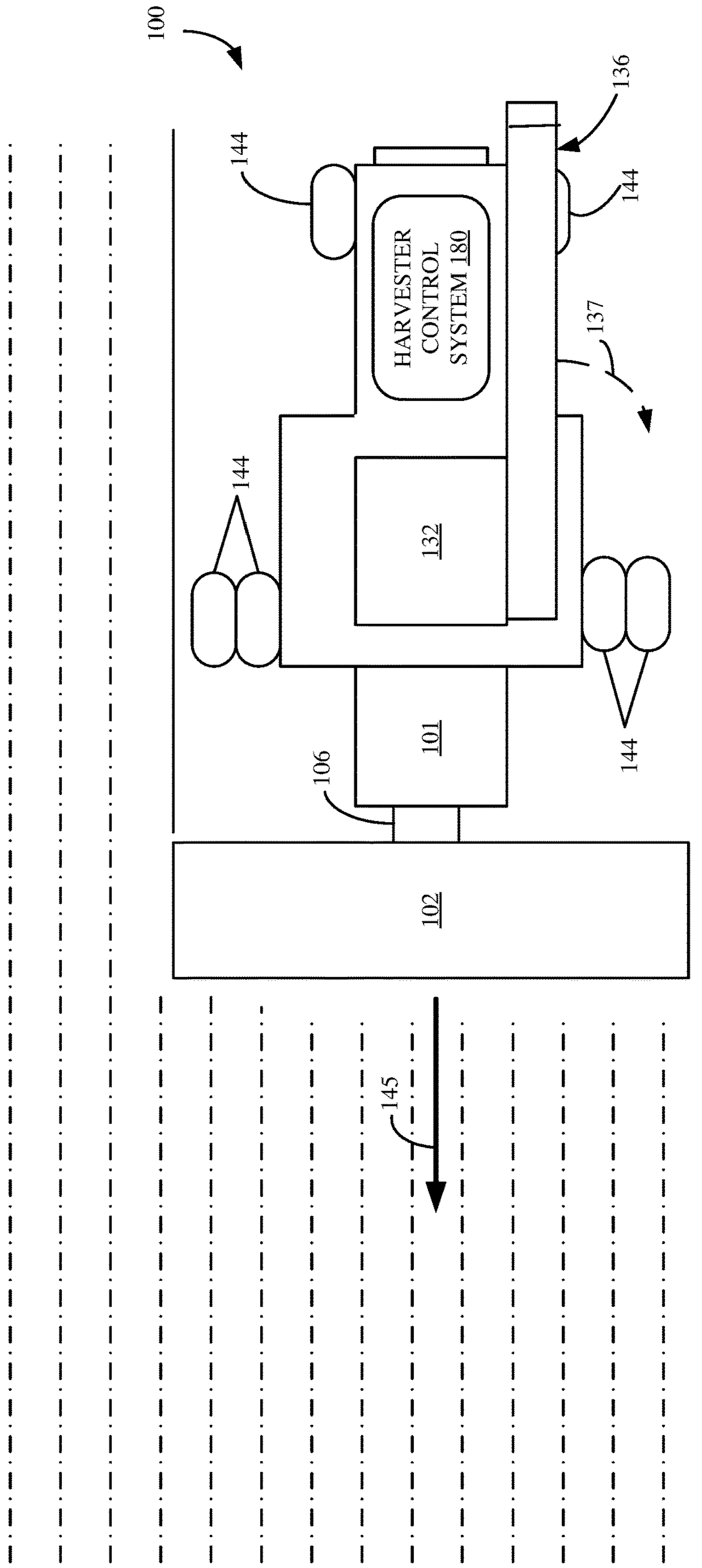
FIG. 1 is a pictorial illustration of one example of a combine harvester harvesting a field.

The present discussion proceeds with respect to an agricultural harvester, but it will be appreciated that the present discussion is also applicable to construction machines or other material loading vehicles as well. As discussed above, an operator is often tasked with controlling the unloading functionality on the harvester while continuing to harvest. It can thus be very difficult for an operator to maintain high efficiency in controlling a harvester, and also to optimally monitor the position of the spout and receiving vehicle during an unloading (or filling) operation and also to manually engage and disengage the unloading auger at the proper times.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of crop deposited inside the receiving vehicle. The system also detects crop height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may be a combine harvester so that the spout is not movable relative to the frame during normal unloading operations. Instead, the spout may be extended to a deployed position prior to unloading, and the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward to rearward, respectively, relative to the combine harvester.

In all of the systems that attempt to automate part or all of the unloading process from a harvester into a receiving vehicle, the operator attempts to determine when to engage and disengage the unloading auger. If the unloading auger is engaged or disengaged at the wrong time, this can result in underfilling the receiving vehicle, overfilling the receiving vehicle, spillage, etc. For purposes of the present discussion, the term leading vehicle will be the vehicle that is unloading material into the receiving vehicle. The term following vehicle will refer to the propulsion vehicle, or towing vehicle, that is providing propulsion to the receiving vehicle (such as a tractor).

The present description thus describes a system in which sensors or detectors are present to detect when an unloading operation should be commenced so that harvested material is unloaded from a harvester into a receiving vehicle. The position of the receiving vehicle relative to the harvester is monitored so that when the receiving vehicle is approaching the harvester, the spout can be automatically deployed to its unloading position. Once the receiving vehicle is positioned at a target location relative to the spout, then the unloading auger on the harvester can be automatically engaged to unload material from the clean grain tank in the harvester, through the spout, into the receiving vehicle. The present description also describes a system where detectors or sensors are positioned to detect stop criteria to stop the unloading operation. The stop criteria may indicate that the clean grain tank is empty, that the receiving vehicle is filled to a desired level, that a spill is occurring, etc. Once the stop criteria are detected, the unloading auger is automatically disengaged.

Sensors or detectors can also detect when to move the spout from the retracted position to the deployed position to commence unloading, and automatically control a spout deployment actuator to deploy the spout. The sensors and/or detectors can also detect retraction criteria which indicate that the spout should be moved from its deployed position to its retracted position after the unloading operation is complete. If the retraction criteria are present, then the spout deployment actuator can be automatically actuated to move the spout from its deployed position to its retracted position.

FIG. 1 is a pictorial illustration showing one example in which a leading vehicle is a combine harvester 100. Harvester 100 may have an operator component 101 as well as a header 102 that engages crop, as harvester 100 moves in the direction indicated by arrow 145. The crop is processed and placed in a clean grain tank 132. The clean grain is then unloaded, such as using an auger, through spout 136 and into a receiving vehicle that is pulled by a following vehicle. It should be noted that in the example shown in FIG. 1, spout 136 is in a retracted position. In order to unload material into a receiving vehicle, a spout position actuator is actuated to move spout 136 in the direction indicated by arrow 137 to a deployed, position described in greater detail below with respect to FIG. 2. FIG. 1 also shows that combine harvester 100 includes a harvester control system 180 that can automatically control harvester 100 to perform an unloading operation), as well as a plurality of ground engaging elements, such as wheels 144, that are used to propel and steer combine harvester 100.

Figure 2:
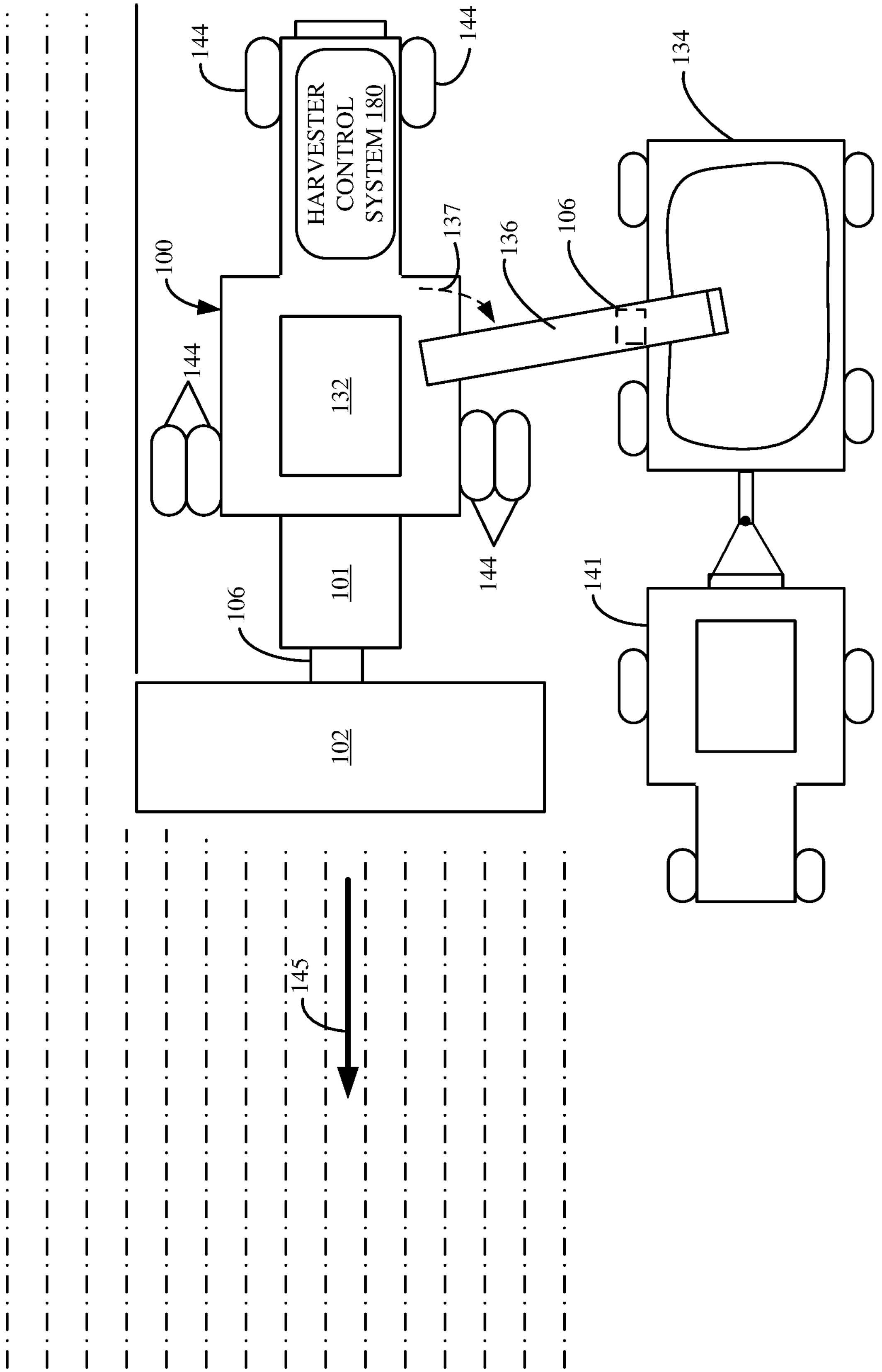
FIG. 2 is a pictorial illustration showing one example of the combine harvester with a spout deployed to unload material into a receiving vehicle.

FIG. 2 is a pictorial illustration of combine harvester 100 in which some items are similar to those shown in FIG. 1 and are similarly numbered. In FIG. 2, spout 136 is pivoted outward along arrow 137 to its deployed position over a receiving vehicle 134 that is towed by a following vehicle 141 (e.g., a tractor towing receiving vehicle 134). When harvester 100 is a combine harvester, it may be that spout 136 is not moved relative to the frame of harvester 100 during a normal unloading operation. Instead, the relative position of the receiving vehicle 134 and the combine harvester 100 is changed in order to fill the receiving vehicle as desired. Therefore, spout 136 may include an optical sensor 106 (or another sensor) that generates an output indicative of where material is landing in receiving vehicle 134 and indicative of a relative position of the outlet end 182 of spout 136 and the receiving vehicle 134. If a front-to-back fill strategy is to be employed, for example, then the relative position of receiving vehicle 134, relative to the combine harvester 100, is changed so that the spout 136 is first filling the receiving vehicle 134 at the front end and then gradually fills the receiving vessel 134 moving rearward.

The present description describes a system which includes harvester control system 180. Harvester control system 180 automatically detects when an unloading operation is to be commenced and then automatically controls an actuator to pivot spout 136 from the retracted position shown in FIG. 1 to the deployed position shown in FIG. 2. The harvester control system can automatically engage and disengage an unloading auger. The harvester control system 180 can also include or receive inputs from a wide variety of sensors or detectors that detect various criteria so that harvester control system 180 can control controllable subsystems to automatically perform the desired unloading operation. Such things are described in greater detail below with respect to FIG. 4. By automatically it is meant that the operation or function is performed without further human involvement, except perhaps to initiate or authorize the operation or function.

Before proceeding with that description, however, a more detailed description of one example of a harvester 100 is first provided.

Figure 3:
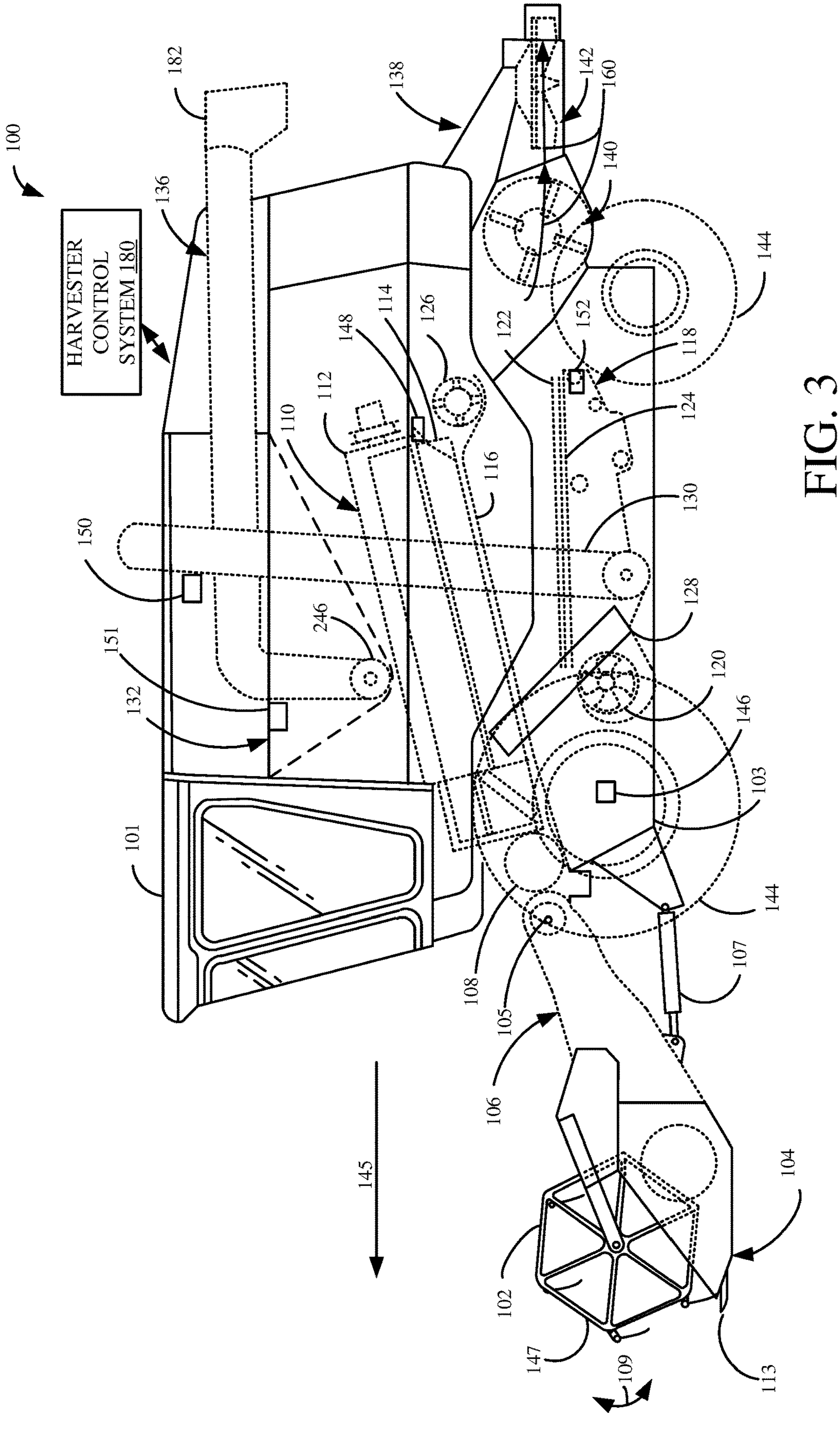
FIG. 3 shows one example of a combine harvester, in more detail.

FIG. 3 is a partial pictorial, partial schematic, illustration of a self-propelled agricultural harvester 100. In the illustrated example, agricultural harvester 100 is a combine harvester. Further, although combine harvesters are provided as examples throughout the present description, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters mentioned above and is, thus, not limited to combine harvesters. The present description also applies to loading operations in construction equipment, such as cold planers, etc.

As shown in FIG. 3, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above the ground over which the header 102 travels is controllable by actuating actuator 107. While not shown in FIG. 3, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem also includes discharge beater 126, tailings elevator 128, clean grain elevator 130, as well as unloading auger 246 and spout 136. The clean grain elevator 130 moves clean grain into clean grain tank 132. Unloading auger 246 is a conveyor which moves material from clean grain tank 132, through spout 136, out an outlet end 182 (which may have a movable flap) of spout 136. Agricultural harvester 100 also includes a residue handling system 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have a steering subsystem, an auger actuator, a spout swing actuator, etc. (described in greater detail below) and more than one of any of the subsystems mentioned above. In some examples, agricultural harvester 100 may have left and right cleaning subsystems, separators, etc., which are not shown in FIG. 3.

In operation, and by way of overview, agricultural harvester 100 illustratively moves through a field in the direction indicated by arrow 145. As agricultural harvester 100 moves, header 102 (and the associated reel 147) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above the ground based on a height setting and, where applicable, at desired tilt and roll angles. Each of the height, roll, and tilt settings may be implemented independently of the others. The control system responds to header error (e.g., the difference between the height setting and measured height of header 102 above the ground and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue handling system 138. The portion of residue transferred to the residue handling system 138 is chopped by residue chopper 140 and spread on the field by spreader 142. In other configurations, the residue is released from the agricultural harvester 100 in a windrow. In other examples, the residue handling system 138 can include a tail board, weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue along a residue travel path rearwardly in agricultural harvester 100 toward the residue handling system 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

During unloading, spout 136 is moved to a deployed position and auger 246 is engaged to move material from clean grain tank 132 out through spout 136.

FIG. 3 also shows that, in one example, agricultural harvester 100 includes ground speed sensor 146, one or more separator loss sensors 148, a clean grain camera 150, which may be in the form of a stereo or mono camera, a clean grain tank level sensor 151, and one or more loss sensors 152 provided in the cleaning subsystem 118. Agricultural harvester 100 can also include a residue sensor that is mounted to residue handling system 138 to sense a characteristic of the residue, as well as other sensors described elsewhere herein.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a geographic location sensor, such as a global positioning system (GPS), another global navigation satellite system (GNSS), a dead reckoning system, a cellular triangulation system, or a wide variety of other systems or sensors that provide an indication of the location of the agricultural harvester 100 in a global or local coordinate system. Travel speed can be sensed or derived from a plurality of outputs from the sensor.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 3. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above the ground; mechanical stability sensors that sense oscillation or bouncing motion (and amplitude) of agricultural harvester 100; a residue setting sensor that is configured to sense whether agricultural harvester 100 is configured to chop and spread the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables. Other sensors are described below with respect to FIG. 4.

Figure 4:
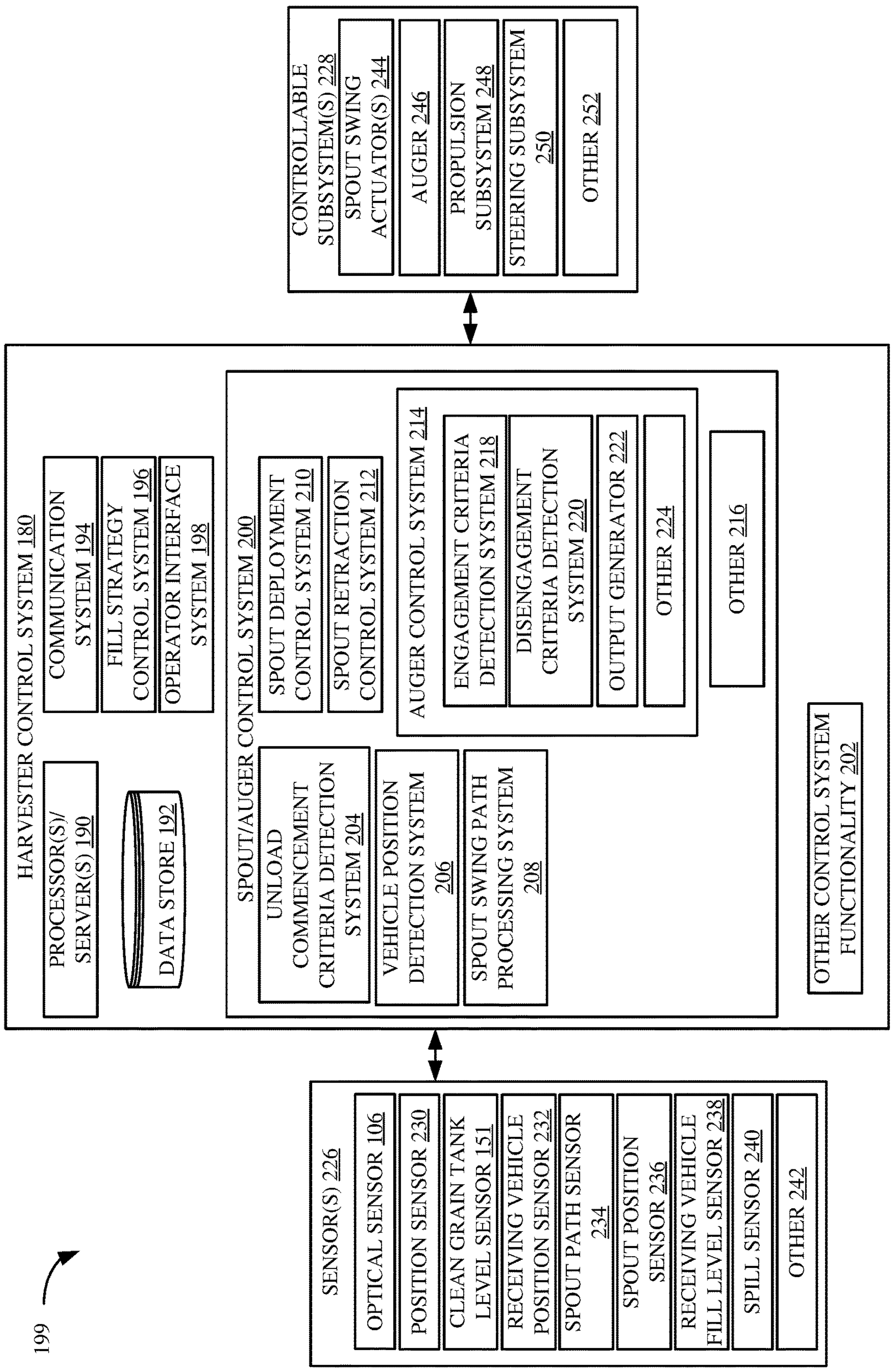
FIG. 4 shows one example of an agricultural system.

FIG. 4 is a block diagram showing one example of an agricultural system 199 with a portion of harvester control system 180. In the example shown in FIG. 4, harvester control system 180 includes one or more processors or servers 190, data store 192, communication system 194, fill strategy control system 196, operator interface system 198, spout/auger control system 200, and any of a wide variety of other control system functionality 202. In the example shown in FIG. 4, spout/auger control system 200 includes unload commencement criteria detection system 204, vehicle position detection system 206, spout swing path processing system 208, spout deployment control system 210, spout retraction control system 212, auger control system 214, and other items 216. Auger control system 214, in the example shown in FIG. 4, includes engagement criteria detection system 218, disengagement criteria detection system 220, output generator 222, and other items 224.

In the example shown in FIG. 4, harvester control system 180 receives inputs from any of a wide variety of different types of sensors or detectors 226, and generates outputs to control one or more controllable subsystems 228. Sensors 226 can include optical sensor 106 (also shown in FIG. 2), position sensor 230, clean grain tank level sensor 151 (also shown in FIG. 3), receiving vehicle position sensor 232, spout path sensor 234, spout position sensor 236, receiving vehicle fill level sensor 238, spill sensor 240, and any of a wide variety of other sensors 242. Controllable subsystems 228 can include spout swing actuators 244, unloading auger 246, propulsion subsystem 248, steering subsystem 250, and any of a wide variety of other subsystems 252. Before describing the overall operation of harvester control system 180 in more detail, a description of some of the items in agricultural system 199 will be described in more detail.

Communication system 194 can facilitate the communication of items in harvester control system 180 with one another, and also communication with other items. Therefore, communication system 194 may be a controller area network (CAN) bus and bus controller, a near field communication system, a wide area communication system, a local area communication system, a Wi-Fi and/or Bluetooth communication system, a cellular communication system, and any of a wide variety of other communication systems that facilitate communication over one or more networks. Operator interface system 198 can include such things as a steering wheel, joysticks, pedals, levers, buttons, and/or a display that displays user actuatable input mechanisms, such as icons, buttons, links, etc. The display may be touch sensitive, and the user interface system may also include a microphone and speakers where speech recognition and/or speech synthesis are provided. Other audio, visual, and/or haptic functionality can be provided as well.

Fill strategy control system 196 receives inputs from various sensors 226 (and possibly other items) and controls propulsion subsystem 248 and/or steering subsystem 250 (and possibly communication system 194) to conduct an unloading operation so that receiving vehicle 134 is filled according to a desired fill strategy, such as a front-to-back fill strategy, a back-to-front fill strategy, a multi-pass fill strategy, etc. Based upon the position of the two vehicles relative to one another, and based upon the fill level in the receiving vehicle 134, fill strategy control system 196 may control the propulsion subsystem 248 on harvester 100 and/or issue a nudge command to control the propulsion system on the following vehicle 141 to change the relative position of the two vehicles.

Spout/auger control system 200 illustratively receives various sensor signals and/or other inputs and controls the spout swing actuators 244 to swing spout 136 between the retracted position shown in FIG. 1 and the deployed position shown in FIG. 2. Unload commencement criteria detection system 204 receives various sensor and/or other signals and detects when unload commencement criteria are present, indicating that an unload operation should be performed. For instance, in one example, unload commencement criteria detection system 204 receives an input from clean grain tank level sensor 151 indicating the level of harvested material in the clean grain tank 132. When the level of material reaches a desired level, this may indicate that an unloading operation should be commenced. In another example, system 204 may receive an input from receiving vehicle position sensor 232 indicating that a following vehicle 136 is approaching harvester 100 and is within close enough proximity to harvester 100 that spout 136 should be moved to its deployed position to prepare for an unload operation. Vehicle position detection system 206 can also receive an input from receiving vehicle position sensor 232 and position sensor 230 indicating whether the receiving vehicle 136 is in a desired position relative to harvester 100 to commence an unloading operation.

Spout swing path processing system 208 can detect whether there are any obstacles in the swing path of spout 136. For instance, spout swing path processing system 208 may receive an input from one or more spout path sensors 234 and determine whether the swing path 137 is free for spout 136 to move from the retracted position to the deployed position. Based upon the various outputs from systems 204, 206, and/or 208, spout deployment control system 210 can generate control signals to control spout swing actuators 244 to move spout 136 to its deployed position. Spout retraction control system 212 can determine whether retraction criteria are present (such as that the clean grain tank 132 is empty, a spill is occurring, the receiving vehicle 134 has been filled, etc.) to determine whether it is time to retract the spout 136 to its retracted position.

Auger control system 214 determines when it is time to engage auger 246 to actually begin moving harvested material from the clean grain tank 132 to the receiving vehicle 134 and when it is time to disengage auger 246. Engagement criteria detection system 218 detect auger engagement criteria (such as criteria indicating that the spout 136 is in the desired position relative to the receiving vehicle 134). If so, output generator 222 can generate a control signal to control auger 246 to engage auger 246. Disengagement criteria detection system 220 detects criteria indicating that auger 246 should be disengaged. Such criteria may be that the clean grain tank 132 is empty, that the receiving vehicle 134 is filled, that a spill is occurring, etc. In that case, output generator 222 generates a control signal to disengage auger 246.

As discussed above, position sensor 230 may be a global navigation satellite system (GNSS) receiver, a dead reckoning system, a cellular triangulation system, or any of a wide variety of other sensors that can provide an output indicative of the location of harvester 100. Clean grain tank level sensor 151 can be an optical sensor, an ultrasound sensor, a RADAR sensor, or any of a wide variety of other sensors that can sense the fill level of material in clean grain tank 132. Receiving vehicle position sensor 232 can be a sensor that receives an input from a GNSS receiver on the receiving vehicle 134 (or following vehicle 141), as well as an input from position sensor 230 on harvester 100 and identifies the distance and direction of separation of the two vehicles (100 and 134,141), as well as whether the separation distance is increasing or decreasing, etc. Receiving vehicle position sensor 232 may also be an ultrasound sensor, a RADAR sensor, or another sensor that can be used to sense the position of the receiving vehicle relative to harvester 100.

Spout path sensor 234 can be an optical sensor, a RADAR sensor, an ultrasound sensor, a LIDAR sensor, etc. Such sensors can be configured to sense obstacles in the swing path of spout 136.

Receiving vehicle fill level sensor 238 can be optical sensor 106 or a different sensor that may be mounted on the spout 136 of harvester 100 to identify the fill level of material in the receiving vehicle.

Spout position sensor 236 may be a sensor that senses the position of spout 136 (such as whether it is in its deployed position, retracted position, or between those two positions). The spout position sensor may be a linear sensor that senses the length of extension or retraction of a hydraulic or other actuator that is used to move spout 136 between its deployed position and its retracted position. Spout position sensor 236 can also be Hall Effect sensor, a potentiometer or other rotational sensor, or angle encoder, or any of a wide variety of other position sensors. Spill sensor 240 can also be an optical sensor as well as image processing functionality that determines whether a spill is occurring, or a sensor that compares the location of the output end 182 of spout 136 to the location of the boundary of the receiving vehicle 134. If the output end 182 of spout 136 is outside of the boundary of the receiving vehicle, then spill sensor 240 can determine that a spill is occurring. Harvester control system 180, or the sensors 226 themselves, can also include sensor signal processing system(s) which process the signals from sensors 226. Such a system May amplify, normalize, filter, linearize, and otherwise process the sensor signals. Further, where sensors 226 are optical or other sensors, the sensor signal processing system may include an image processing system that processes captured images to identify information in those captured images, or that otherwise processes the senor signal to capture desired information.

Spout swing actuators 244 may be linear actuators, such as hydraulic cylinders, rotary actuators, or any of a wide variety of different types of actuators that can move spout 136 between the retracted position and the deployed position. Auger 246 is illustratively an auger or other conveyor within spout 136 that moves the harvested material from clean grain tank 130 out through the output end 182 of spout 136. Propulsion subsystem 248 can be an engine and transmission that drives the ground engaging elements 144 of harvester 100, or individual motors or sets of motors that drive the ground engaging elements 144 individually or in sets. Steering subsystem 250 can be used to steer the ground engaging elements 144 or to otherwise adjust the heading of harvester 100 as it travels.

Figure 5A:
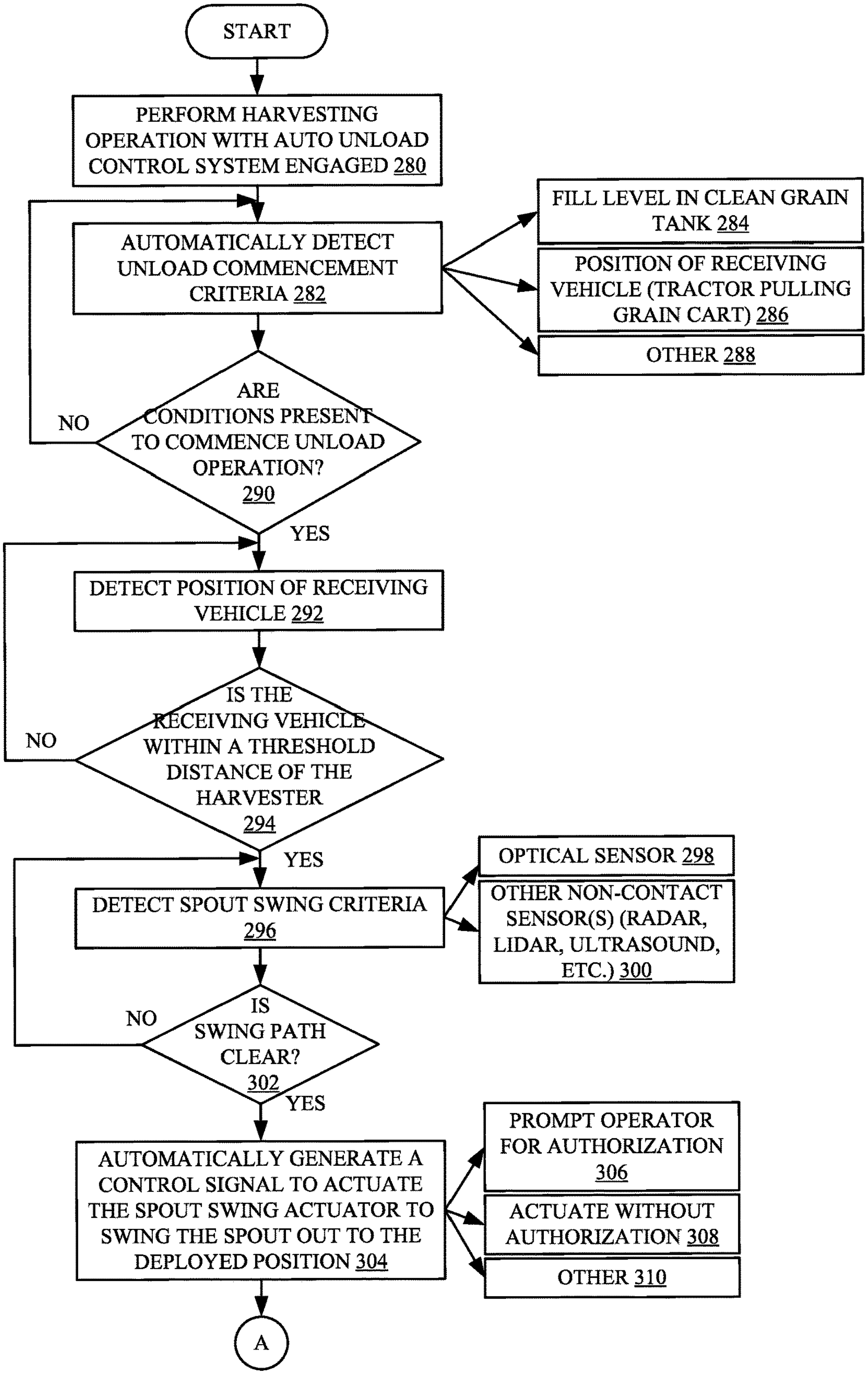
FIGS. 5A, 5B, and 5C (collectively referred to herein as FIG. 5) show a flow diagram illustrating one example of the operation of the agricultural system shown in FIG. 4.
Figure 5B:
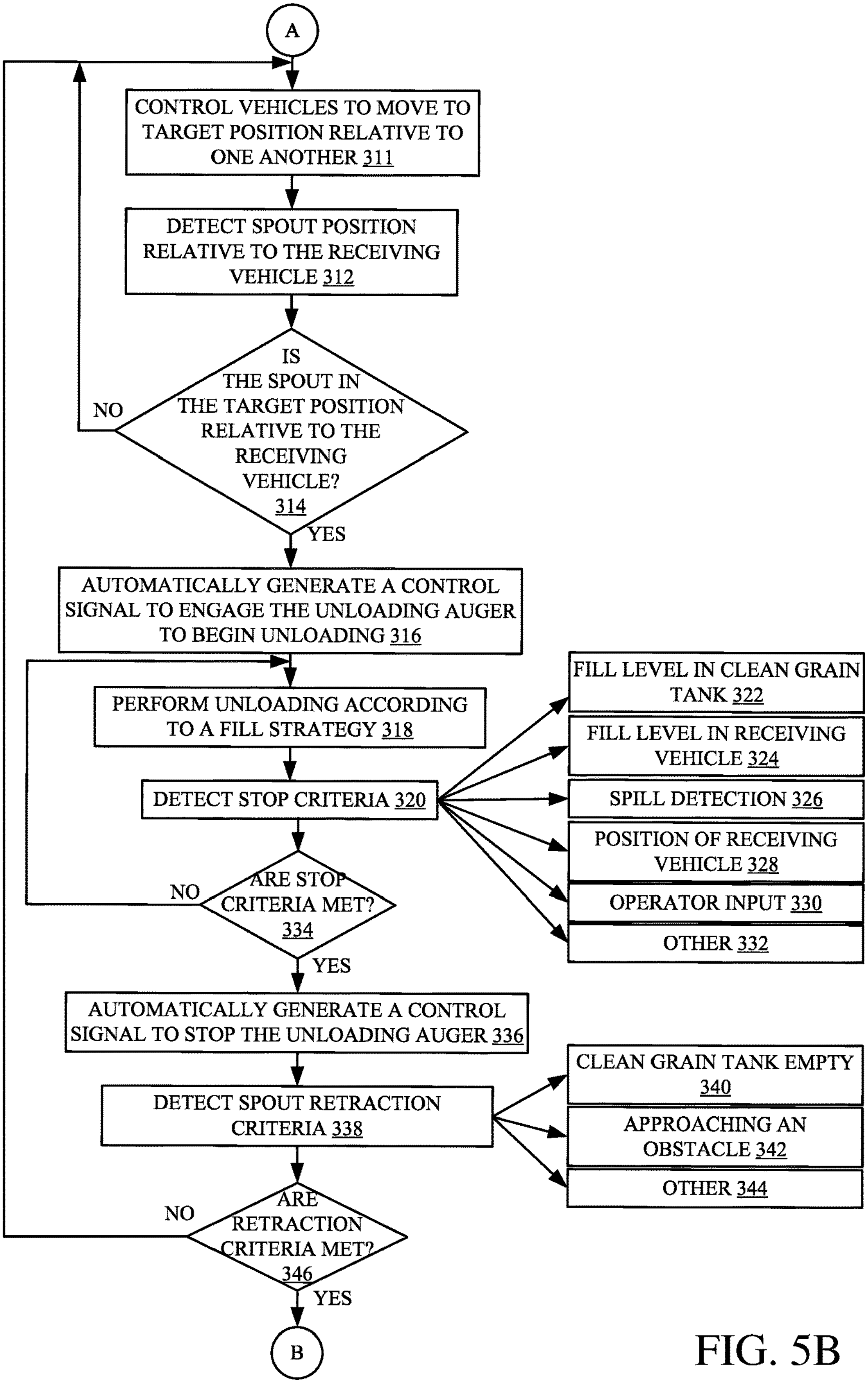
Figure 5C:
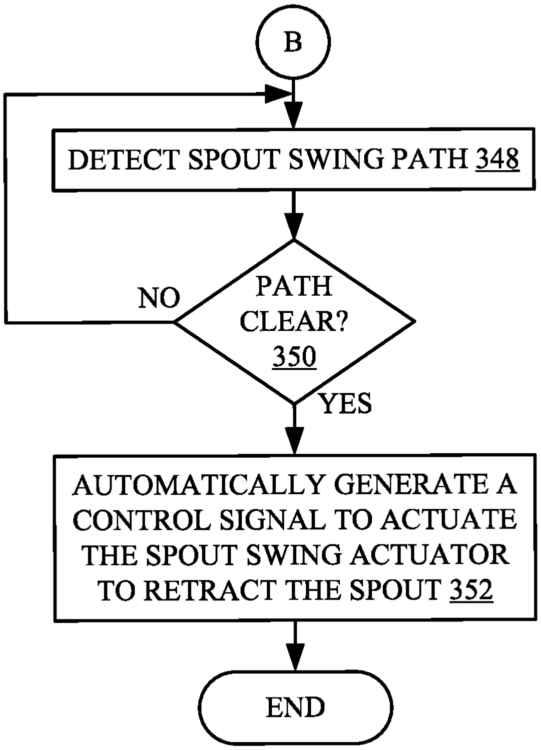

FIGS. 5A, 5B, and 5C (collectively referred to herein as FIG. 5) show flow diagrams illustrating one example of the operation of agricultural system 199 shown in FIG. 4, in deploying spout 136 to its deployed position, performing an unloading operation, and then retracting spout 136 to its retracted position.

It is first assumed that harvester 100 is performing a harvesting operation with the automatic unload functionality in harvester control system 180 engaged or enabled so that an automated unloading operation can be performed. Performing a harvesting operation with the auto-unload features engaged is indicated by block 280 in the flow diagram of FIG. 5.

Unload commencement criteria detection system 204 then automatically detects unload commencement criteria to determine whether an unload operation should be performed, as indicated by block 282 in the flow diagram of FIG. 5. In one example, system 204 receives a signal from clean grain tank level sensor 151 indicating that the fill level in the clean grain tank 132 of harvester 100 is at a target level so that the clean grain tank 132 should be unloaded. Detecting unload commencement criteria including the fill level in the clean grain tank 132 is indicated by block 284 in the flow diagram of FIG. 5. In another example, vehicle position detection system 206 receives an input from receiving vehicle position sensor 232 indicating that the receiving vehicle 134 (and/or following vehicle 141) is next to harvester 100, in another target position relative to harvester 100 (e.g., following harvester 100 and ready to receive material), in transit back to harvester 100 after unloading material into a transfer vehicle, within a desired proximity of harvester 100, etc. For instance, system 206 may determine that the receiving vehicle 134 is within a threshold distance of harvester 100 and is approaching harvester 100. In that case, this may indicate that harvester 100 should prepare to commence an unloading operation. Detecting the commencement criteria as the position of the receiving vehicle 134 relative to the harvester is indicated by block 286 in the flow diagram of FIG. 5. A wide variety of other unload commencement criteria can be automatically detected to indicate that an unload operation should be performed as indicated by block 288 in the flow diagram of FIG. 5.

If unload commencement criteria detection system 204 determines that the unload commencement criteria are present, as indicated by block 290, then vehicle position detection system 206 begins monitoring the relative position of the receiving vehicle 134, relative to the harvester 100, in order to determine whether the receiving vehicle 134 is in a target position relative to the harvester 100, so that the spout 136 should be moved from the retracted position to the deployed position, as indicated by block 292 in the flow diagram of FIG. 5. In one example, it may be desirable to move spout 136 to the deployed position before the receiving vehicle 134 is alongside harvester 100. However, it may also be desirable that the spout 136 is not moved to its deployed position too early so that harvester 100 will not be driving a great distance with the spout 136 in the deployed position. Therefore, once it is determined that an automatic unload operation should be commenced, then spout/auger control system 200 waits until the receiving vehicle 134 is within a threshold distance of harvester 100, before moving the spout 136 to its deployed position. Also, in one example, the spout 136 will be moved to its deployed position prior to the receiving vehicle 134 pulling alongside harvester 100. Determining whether the receiving vehicle 134 is within a threshold distance of the harvester 100 is indicated by block 294 in the flow diagram of FIG. 5.

Once the receiving vehicle 134 is within a threshold distance of harvester 100, then spout swing path processing system 208 determines whether there are any obstacles in the swing path 137 of spout 136. For instance, it may be that harvester 100 is traveling along a fence line where there are trees or other obstacles so that the spout 136 should not be moved into its deployed position. In order to determine whether the swing path of spout 136 is clear, spout swing path processing system 208 may receive an input from one or more spout path sensors 234. Such sensors, as discussed above, maybe optical sensors with image processing, RADAR sensors, LIDAR sensors, etc., that provide an indication of whether an obstacle is in the swing path 137 of spout 136. Detecting spout swing path criteria that indicate the presence of obstacles is indicated by block 296 in the flow diagram of FIG. 5. Detecting the swing path using an optical sensor is indicated by block 298 in the flow diagram of FIG. 5, and detecting the swing path with other non-contact sensors (such as RADAR sensors, LIDAR sensors, ultrasound sensors, etc.) is indicated by block 300 in the flow diagram of FIG. 5.

If the swing path of spout 136 is clear, as determined at block 302 in the flow diagram of FIG. 5, then spout deployment control system 210 can automatically actuate the spout swing actuator 244 to swing the spout 136 out of the retracted position and into the deployed position. Automatically actuating the spout swing actuator 244 is indicated by block 304 in the flow diagram of FIG. 5. In one example, spout deployment control system 210 uses operator interface system 198 to prompt an operator for authorization to initiate the spout swinging process. Prompting the operator for authorization is indicated by block 306 in the flow diagram of FIG. 5. In another example, spout deployment system 210 controls spout swing actuator 244 to move spout 136 to its deployed position without any authorization, as indicated by block 308. Spout deployment control system 210 can generate a control signal to control the spout swing actuator 244 in other ways as well, as indicated by block 310 in the flow diagram of FIG. 5.

Once the spout 136 is moved to its deployed position, then fill strategy control system 196 begins controlling the propulsion subsystem 248, the steering subsystem 250, and/or other subsystems on harvester 100, as well as issuing nudge commands and/or other control commands to control the position of the receiving vehicle 134 in order to bring the two vehicles 100, 134 into a desired position relative to one another so that unloading can commence. Controlling the position of the vehicles to move them into a target position relative to one another in order to commence unloading is indicated by block 311 in the flow diagram of FIG. 5. In order to perform such control operations, fill strategy control system 196 may receive inputs from any of the sensors 226 or other inputs to determine the relative position of the two vehicles, to determine the location of the spout 136 relative to the receiving vehicle 134, to determine the heading and speed of the two vehicles 100, 134, etc., in order to automatically control the vehicles to bring them into a target position relative to one another.

Fill strategy control system 196 detects that the outlet end 182 of spout 136 is in a target position relative to the receiving vehicle 134 so that unloading should begin. For instance, if unloading is being performed according to a front-to-back fill strategy, then fill strategy control system 196 may receive sensor signals from sensors 226 (such as from optical sensor 106 on spout 136) and determine whether the outlet end 182 of spout 136 is at a forward location relative to the receiving vehicle 134. If the fill strategy is a back-to-front fill strategy, or a multi-pass fill strategy, or another fill strategy, then fill strategy control system 196 determines whether the outlet end 182 of spout 136 is at the desired location relative to the receiving vehicle 134 in order to perform that fill strategy. Detecting the position of the outlet end 182 of spout 136 relative to the receiving vehicle 134 is indicated by block 312 in the flow diagram of FIG. 5, and determining whether the outlet end of the spout 136 is in a target position relative to the receiving vehicle is indicated by block 314 in the flow diagram of FIG. 5. If the outlet end of spout 136 is not in a desired position, then fill strategy control system 196 continues to control the position of the vehicles 100, 134 until they are in a desired position relative to one another so that the unloading operation can commence.

If, at block 314, it is determined that the outlet end 182 of the spout 136 is in the desired position relative to the receiving vehicle 134, then engagement criteria detection system 218 (in auger control system 214) may determine that all engagement criteria are met and output generator 222 can generate a control signal to automatically engage the unloading auger 246 to begin unloading material from the clean grain tank 132 through spout 136 into the receiving vehicle 134. Automatically engaging the unloading auger 246 is indicated by block 316 in the flow diagram of FIG. 5. Fill strategy control system 198 then continues to control the vehicles 100, 134 to perform an unloading operation according to a desired fill strategy, as indicated by block 318 in the flow diagram of FIG. 5.

Disengagement criteria detection system 220 also detects whether any stop criteria are present indicating that the auger 246 should be stopped or disengaged. Detecting stop criteria is indicated by block 320 in the flow diagram of FIG. 5.

Detecting stop criteria may include such things as receiving a signal from the clean grain tank level sensor 151 indicating that the clean grain tank 132 is empty, or low enough that the unloading operation should be stopped. Detecting the fill level in the clean grain tank 132 is indicated by block 322 in the flow diagram of FIG. 5. Another stop criteria may be detected by receiving a signal from receiving vehicle fill level sensor 238 (which may be implemented as optical sensor 106 or in other ways) indicating that the fill level in the receiving vehicle 134 has reached a desired level so that the unloading operation should be stopped. Detecting the stop criteria based on the fill level in the receiving vehicle 134 is indicated by block 324 in the flow diagram of FIG. 5. Other stop criteria may be based on a signal from spill sensor 240 indicating that a spill is occurring or that a spill is about to occur as indicated by block 326. Another example of stop criteria may be that the receiving vehicle 134 has moved away from the harvester 100 or the relative position of the two vehicles 100, 134 is such that the unloading auger 246 should be stopped. Detecting stop criteria based upon the relative position of the receiving vehicle 134 and the harvester 100 is indicated by block 328 in the flow diagram of FIG. 5. In yet another example, the stop criteria may be based on an operator input through operator interface system 196 indicating that the unloading auger 246 should be stopped. Detecting stop criteria based on an operator input is indicated by block 330 in the flow diagram of FIG. 5.

It should also be noted that, under certain circumstances, the auto unload functionality in spout/auger control system 200 may be disengaged, at least temporarily. For example, if the operator intervenes to stop the automatic unloading operation, for any of a variety of different reasons, this may mean that the auto unload feature will be disengaged until it is reengaged by the operator using another operator input. In another example, the auto unload feature may be disengaged (when an operator intervention is detected) just for the duration of the current unloading operation. When the current unloading operation has been completed under manual control, then the auto unload feature may be reengaged. In another example, the auto unload feature may be disengaged (based on an operator intervention) for a predetermined period of time. In these circumstances, the operator interface system 198 may generate an operator alert alerting the operator that the auto unload feature has been disengaged or disabled.

Other stop criteria may be detected, or the stop criteria may be detected in other ways as well, as indicated by block 332 in the flow diagram of FIG. 5.

When disengagement criteria detection system 220 determines that stop criteria are met, as indicated at block 334 in the flow diagram of FIG. 5, then output generator 222 generates a control signal to stop auger 246, as indicated by block 336 in the flow diagram of FIG. 5.

Spout retraction control system 212 then determines whether spout retraction criteria are met. It will be noted that the spout retraction criteria may be the same as or different from the stop criteria detected at block 320. For instance, in one example the stop criteria may be met by detecting that the fill level in the receiving vehicle 134 has reached a desired level. In that case, the auger 246 may be stopped. However, if there is still material in the clean grain tank 132, and if another receiving vehicle 134 is closely proximate harvester 100, it may be that the spout 136 should be maintained in its deployed position while the current receiving vehicle 134 pulls away from harvester 100 and the next receiving vehicle 134 pulls up adjacent to harvester 100 so the unloading operation can be continued using the new receiving vehicle 134. Therefore, even though the unloading auger 246 may be stopped, it may be that spout 136 should still be maintained in its deployed position until spout retraction criteria are met. Detecting spout retraction criteria is indicated by block 338 in the flow diagram of FIG. 5. Detecting, as the spout retraction criteria, that the clean grain tank 132 in harvester 100 is empty is indicated by block 340. Another spout retraction criterion can be that harvester 100 is approaching an obstacle that may contact spout 136, if it is maintained in its deployed position. Detecting, as the spout retraction criteria, an upcoming obstacle is indicated by block 342 in the flow diagram of FIG. 5. A wide variety of other spout retraction criteria can be detected in a wide variety of other ways, as indicated by block 344.

Determining whether the retraction criteria are met is indicated by block 346. If, for instance, the auger 246 has been turned off, but the spout retraction criteria are not yet met, this may indicate that there is still clean grain in the clean grain tank 132 that is to be unloaded. Therefore, processing reverts to block 311 where fill strategy control system 196 begins controlling the next receiving vehicle 134 to come into close proximity to the harvester 100 so that the unloading operation can be continued. However, if, at block 346, it is determined that the spout retraction criteria have been met, then spout swing path processing system 208 again detects the spout swing path 137 to determine whether it is clear or whether there are obstacles in the path 137, as indicated by block 348. If the swing path 137 is clear, as indicated by block 350, then spout retraction control system 212 generates a control signal to automatically actuate the spout swing actuator 244 to move spout 136 from its deployed position to the retracted position, as indicated by block 352.

It can thus be seen that the present description describes a system that automatically detects when the spout 136 should be deployed and retracted, and generates control signals to automatically perform those operations. The present description also describes a system which automatically detects when the unloading auger 246 should be started and stopped and generates control signals to automatically perform those operations. This greatly enhances the ability of the operator to concentrate on controlling harvester 100 to perform a harvesting operation without needing to divert attention to control the unloading operation at the same time. This also enables a more fully automated process.

The present discussion has mentioned processors and servers. In one example, the processors and servers include computer processors with associated memory and timing circuitry, not separately shown. The processor and servers are functional parts of the systems or devices to which they belong and are activated by, and facilitate the functionality of the other components or items in those systems.

Also, a number of user interface displays (UI) have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, sensors, and/or logic. It will be appreciated that such systems, components, generators, sensors, and/or logic can be comprised of hardware items (such as processors and associated memory, or other processing components, some of which are described below) that perform the functions associated with those systems, components, generators, sensors, and/or logic. In addition, the systems, components, generators, sensors, and/or logic can be comprised of software that is loaded into a memory and is subsequently executed by a processor or server, or other computing component, as described below. The systems, components, generators, sensors, and/or logic can also be comprised of different combinations of hardware, software, firmware, etc., some examples of which are described below. These are only some examples of different structures that can be used to form the systems, components, generators, sensors, and/or logic described above. Other structures can be used as well.

Figure 6:
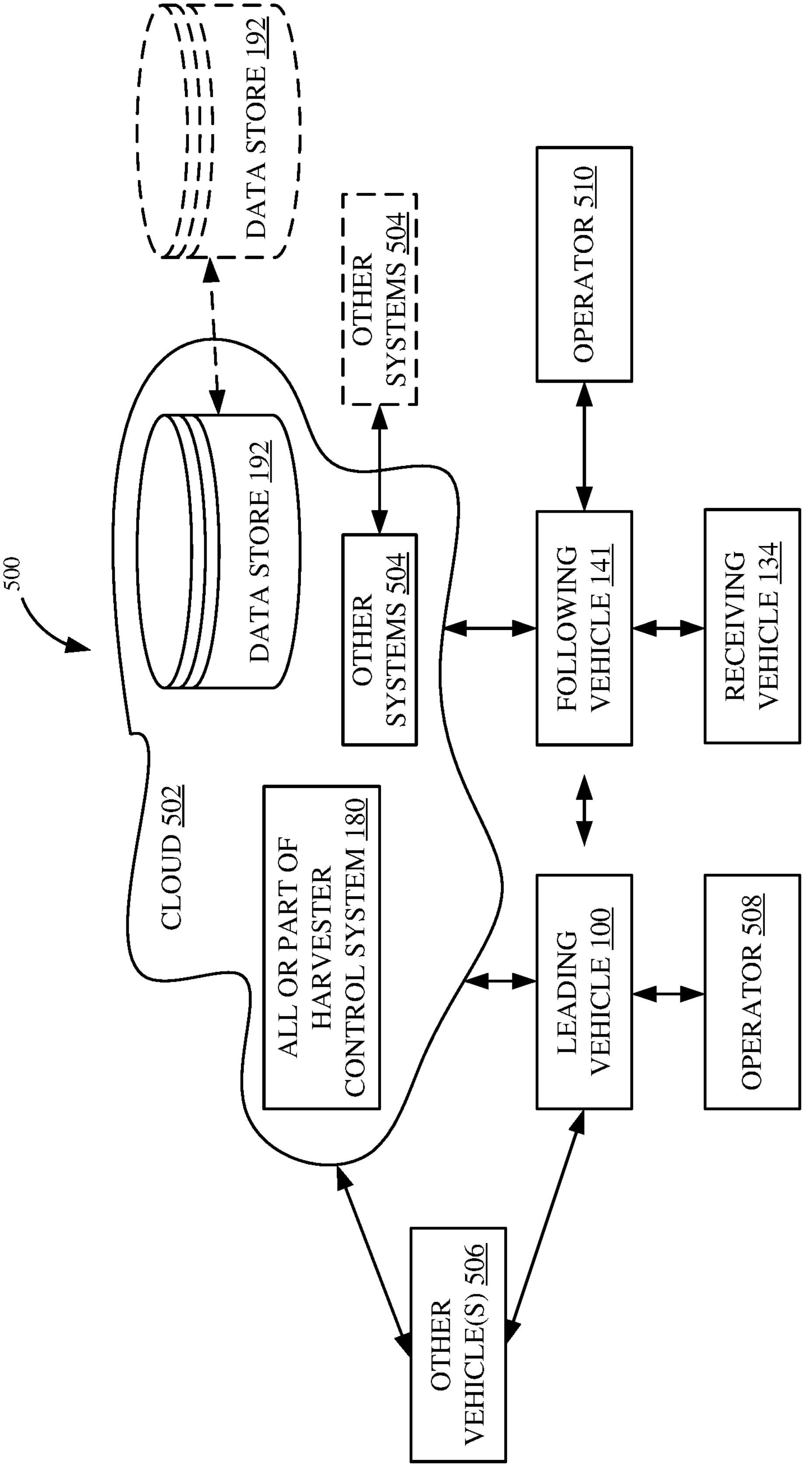
FIG. 6 is a block diagram showing one example of the agricultural system illustrated in FIG. 4, deployed in a remote server architecture.

FIG. 6 is a block diagram of harvester 100, shown in FIG. 4, except that it communicates with other vehicles 506, elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 6, some items are similar to those shown in previous FIGS. and they are similarly numbered. FIG. 6 shows that vehicles 100 and/or 141 can have operators 508 and/or 510, respectively. FIG. 6 specifically shows that all or parts of harvester control system 180 and/or other systems 504, and data store 192, or other items, can be located at a remote server location 502. Therefore, harvester 100 accesses those systems through remote server location 502.

FIG. 6 also depicts another example of a remote server architecture. FIG. 6 shows that it is also contemplated that some elements of previous FIGS. are disposed at remote server location 502 while others are not. By way of example, data store 192 and/or other systems can be disposed at a location separate from location 502, and accessed through the remote server at location 502. Regardless of where the items are located, the items can be accessed directly by harvester 100, through a network (either a wide area network or a local area network), the items can be hosted at a remote site by a service, or the items can be provided as a service, or accessed by a connection service that resides in a remote location. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
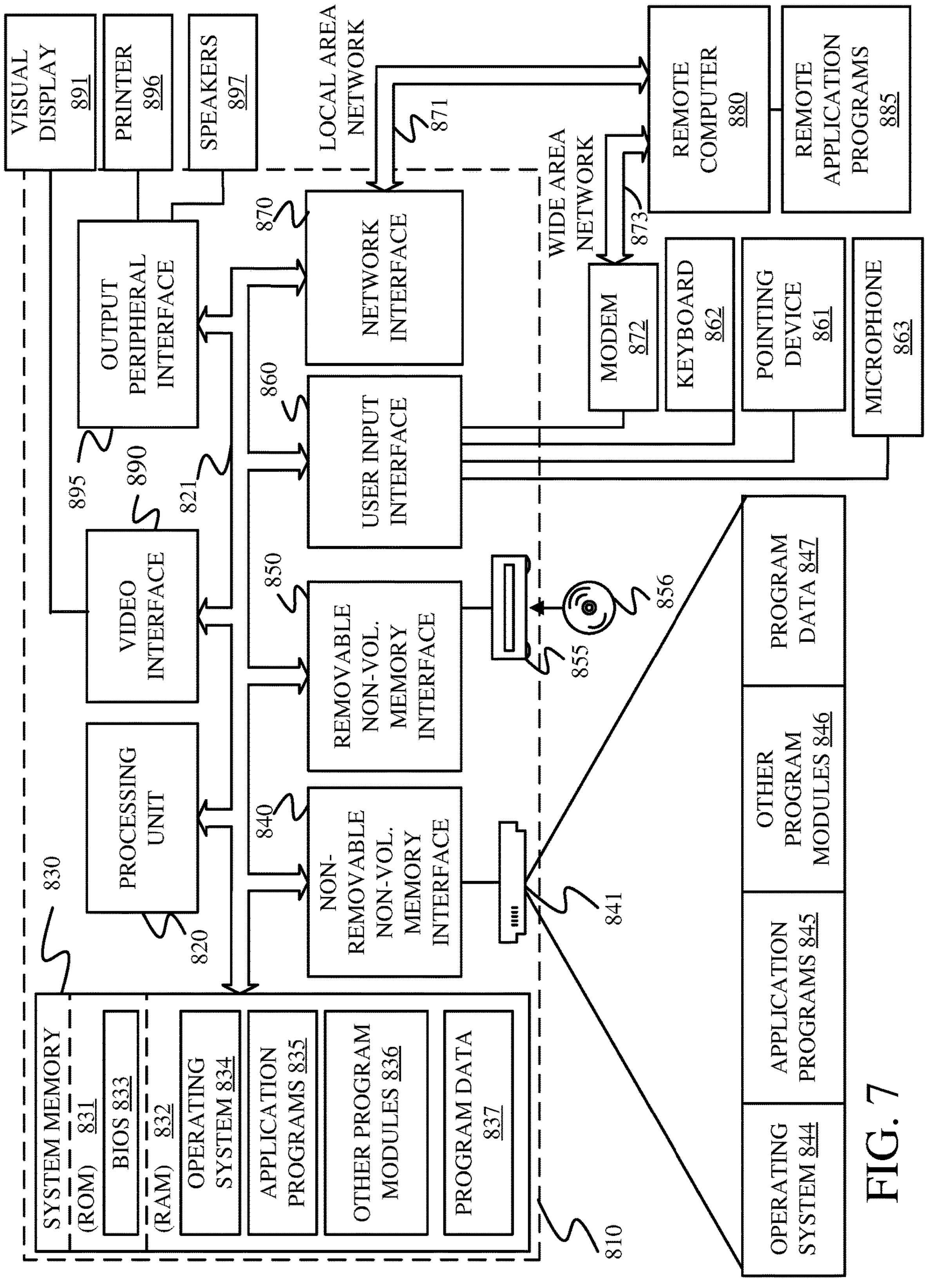
FIG. 7 is a block diagram showing one example of a computing environment that can be used in the architectures and systems shown in the previous figures.

FIG. 7 is one example of a computing environment in which elements of previous FIGS., or parts of it, (for example) can be deployed. With reference to FIG. 7, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
- automatically detecting that an unload commencement criterion is present based on a determination that a detected level of harvested material in a storage tank of a harvester meets a target level;
- based on detecting that the unload commencement criterion is present, automatically generating a spout swing control signal to control a spout swing actuator to move a spout from a retracted position to a deployed position;
- after detecting that the unload commencement criterion is present, automatically detecting an engagement criterion indicating that an unloading conveyor on the harvester is to be engaged; and
- automatically generating a conveyor start control signal to control the unloading conveyor to unload at least a portion of the harvested material from the harvester through the spout based on detection of the engagement criterion.

2. The computer implemented method of claim 1 and further comprising:
- automatically detecting a disengagement criterion indicating that the unloading conveyor on the harvester is to be disengaged; and
- automatically generating a conveyor stop control signal to control the unloading conveyor to stop unloading harvested material from the harvester based on detection of the disengagement criterion.

3. The computer implemented method of claim 2 wherein automatically detecting a disengagement criterion comprises:
- detecting a fill level in a clean grain tank of the harvester;
- determining whether the fill level in the clean grain tank is at a predefined stop level; and
- if so, generating an output indicating that the disengagement criterion is detected.

4. The computer implemented method of claim 2 wherein automatically detecting a disengagement criterion comprises:
- detecting a fill level in a receiving vehicle;
- determining whether the fill level in the receiving vehicle is at a target level; and
- if so, generating an output indicating that the disengagement criterion is detected.

5. The computer implemented method of claim 2 wherein automatically detecting a disengagement criterion comprises:
- detecting a material spill condition; and
- generating an output indicating that the disengagement criterion is detected.

6. The computer implemented method of claim 2 wherein automatically detecting a disengagement criterion comprises:
- detecting an operator stop input; and
- generating an output indicating that the disengagement criterion is detected.

7. The computer implemented method of claim 1 wherein automatically detecting an engagement criterion comprises:
- detecting a position of an outlet end of the spout relative to a receiving vehicle;
- determining whether the outlet end of the spout is in a target position relative to the receiving vehicle; and
- if so, generating an output indicating that the engagement criterion is detected.

8. The computer implemented method of claim 1, wherein the storage tank comprises a receiving vehicle, and further comprising:
- prior to automatically detecting the engagement criterion and after detecting the unload commencement criterion, automatically detecting a receiving vehicle position criterion; and
- generating the spout swing control signal based on both the unload commencement criterion and the receiving vehicle position criterion.

9. The computer implemented method of claim 8, and further comprising:
- prior to automatically detecting the engagement criterion and after detecting the unload commencement criterion, automatically detecting a swing path criterion; and
- generating the spout swing control signal based on each of the unload commencement criterion, the receiving vehicle position criterion, and the swing path criterion.

10. The computer implemented method of claim 9, wherein automatically detecting the swing path criterion comprises:
- prior to automatically generating the spout swing control signal, detecting whether an obstacle is present in a spout swing path through which the spout moves between the retracted position and the deployed position; and
- if not, generating an output indicating that the spout swing path is unobstructed.

11. The computer implemented method of claim 8 wherein automatically detecting the receiving vehicle position criterion comprises:
- automatically detecting a location of a receiving vehicle; and
- determining that the receiving vehicle position criterion is met based on the location of the receiving vehicle.

12. The computer implemented method of claim 8 wherein automatically detecting the receiving vehicle position criterion comprises:
- automatically detecting that a position of the receiving vehicle is within a desired proximity relative to a position of the harvester; and
- if so, automatically generating the spout swing control signal to control the spout swing actuator to move the spout from the retracted position to the deployed position.

13. The computer implemented method of claim 12 and further comprising:

automatically detecting whether a spout retraction criterion is present; and if so, automatically generating the spout swing control signal to move the spout from the deployed position to the retracted position.

14. An agricultural system, comprising:

an unloading conveyor on a harvester configured to convey harvested material from the harvester to a receiving container;

a spill sensor configured to detect occurrence of material spill from the receiving container;

at least one processor;

an engagement criterion detection system, implemented by the at least one processor, configured to automatically detect an engagement criterion indicating that an unloading conveyor on a harvester is to be engaged;

a disengagement criteria detection system, implemented by the at least one processor, configured to automatically detect a disengagement criterion based on the material spill detected by the spill sensor, the disengagement criterion indicating that the unloading conveyor on the harvester is to be disengaged; and an output generator, implemented by the at least one processor, configured to automatically generate a conveyor start control signal to control the unloading conveyor to unload harvested material from the harvester to the receiving container through a spout based on detection of the engagement criterion and to automatically generate a conveyor stop control signal to control the unloading conveyor to stop unloading harvested material from the harvester based on detection of the disengagement criterion.

15. The agricultural system of claim 14 and further comprising:

a spout swing actuator configured to move the spout from a retracted position to a deployed position;

an unload commencement criteria detection system configured to automatically detect whether an unload commencement criterion is present; and a spout deployment control system configured to automatically generate a spout control signal, based on detection of the unload commencement criterion, to control the spout swing actuator to move the spout from a retracted position to a deployed position.

16. The agricultural system of claim 15 and further comprising:

a spout swing path processing system configured to automatically detect, and generate a swing path signal indicative of, whether an obstacle is present in a spout swing path through which the spout moves between the retracted position and the deployed position, the spout deployment control system generating the spout control signal based on the swing path signal.

17. The agricultural system of claim 16 and further comprising:

a spout retraction control system configured to automatically detect whether a spout retraction criterion is present and to automatically generate the spout control signal to move the spout from the deployed position to the retracted position based on detection of the spout retraction criterion.

18. The agricultural system of claim 14 and further comprising:

at least one sensor configured to sense a variable indicative of the engagement criterion and generate a sensor signal having a first value indicative of the sensed variable, the engagement criterion detection system being configured to automatically detect the engagement criterion based on the first value, the at least one sensor being configured to sense a variable indicative of the disengagement criterion and generate a sensor signal having a second value indicative of the sensed variable, the disengagement criteria detection system being configured to automatically detect the disengagement criterion based on the second value.

* * * * *